(12) United States Patent
Dubey et al.

(10) Patent No.: US 12,602,320 B2
(45) Date of Patent: Apr. 14, 2026

(54) DYNAMIC PAGE MAPPING USING HEADER TO IDENTIFY COMPRESSED DATA

(71) Applicant: Micron Technology, Inc., Boise, ID (US)

(72) Inventors: Rishabh Dubey, Agrate Brianza (IT); Marco Sforzin, Cernusco sul Naviglio (IT); Emanuele Confalonieri, Segrate (IT); Danilo Caraccio, Milan (IT); Daniele Balluchi, Cernusco sul Naviglio (IT); Nicola Del Gatto, Cassina de' Pecchi (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/782,147

(22) Filed: Jul. 24, 2024

(65) Prior Publication Data

US 2025/0094343 A1 Mar. 20, 2025

(30) Foreign Application Priority Data

Sep. 18, 2023 (IN) .............................. 202311062639

(51) Int. Cl.
*G06F 12/02* (2006.01)

(52) U.S. Cl.
CPC .... *G06F 12/0246* (2013.01); *G06F 2212/401* (2013.01); *G06F 2212/7201* (2013.01)

(58) Field of Classification Search
CPC ......... G06F 12/0246; G06F 2212/7201; G06F 2212/401
See application file for complete search history.

(56) References Cited

U.S. PATENT DOCUMENTS

| | | | |
|---|---|---|---|
| 4,908,874 A | 3/1990 | Gabriel | |
| 5,627,995 A | 5/1997 | Miller et al. | |

(Continued)

FOREIGN PATENT DOCUMENTS

| | | |
|---|---|---|
| CN | 119645296 | 3/2025 |
| CN | 119645897 | 3/2025 |
| WO | WO-2020096639 A1 | 5/2020 |

OTHER PUBLICATIONS

Blankenship, Robert, "Compute Express Link CXL Memory and Cache Protocols", Storage Developer Conference, [Online] Retrieved from the internet:https: snia.org sites default files SDC 2020 130-Blankenship-CXL-1.1-Protocol-Extensions.pdf, (Sep. 2020), 44 pages.

(Continued)

*Primary Examiner* — Chie Yew
(74) *Attorney, Agent, or Firm* — Schwegman Lundberg & Woessner, P.A.

(57) ABSTRACT

A variety of applications can include a memory device having dynamic page mapping with compression. The memory device can include a mapping table having an entry location to associate a virtual page with a physical address of a first stripe of data of the virtual page. The entry location can include a flag along with the physical address of the first stripe. The flag can identify data of the virtual page as being compressed or uncompressed. A controller of the memory device, responsive to the flag identifying the data of virtual page being compressed, is structured to generate a format of compressed data of the first stripe with a header. The header can include a count of additional physical addresses to store compressed data of the virtual page and the additional physical addresses. Additional apparatus, systems, and methods are disclosed.

20 Claims, 6 Drawing Sheets

(56)  References Cited

U.S. PATENT DOCUMENTS

| | | | |
|---|---|---|---|
| 6,968,424 B1 | 11/2005 | Danilak | |
| 10,572,378 B2 | 2/2020 | Li et al. | |
| 10,691,626 B2 | 6/2020 | Nale et al. | |
| 11,036,427 B2 | 6/2021 | Sallese et al. | |
| 2002/0178332 A1 | 11/2002 | Wilson et al. | |
| 2011/0320730 A1 | 12/2011 | Blake et al. | |
| 2012/0324129 A1 | 12/2012 | Chan et al. | |
| 2015/0281717 A1 | 10/2015 | Yukawa et al. | |
| 2017/0024160 A1 | 1/2017 | Feldman | |
| 2017/0046273 A1* | 2/2017 | Cohen | G11C 29/04 |
| 2018/0137044 A1 | 5/2018 | Jo et al. | |
| 2019/0324912 A1 | 10/2019 | Toivanen | |
| 2021/0036714 A1 | 2/2021 | Martin et al. | |
| 2021/0232450 A1* | 7/2021 | Vankamamidi | G06F 11/0727 |
| 2022/0129388 A1* | 4/2022 | Balakrishnan | G11C 11/5628 |
| 2024/0094908 A1 | 3/2024 | Agrawal et al. | |
| 2025/0094047 A1 | 3/2025 | Sforzin et al. | |
| 2025/0094344 A1 | 3/2025 | Dubey et al. | |
| 2025/0110670 A1 | 4/2025 | Erickson | |
| 2025/0190446 A1 | 6/2025 | Martin et al. | |

OTHER PUBLICATIONS

U.S. Appl. No. 18/782,380, filed Jul. 24, 2024, Chained Mapping With Compression.

U.S. Appl. No. 18/782,539, filed Jul. 24, 2024, Dual Compression in Memory Devices.

Synopsys, "An Introduction to the CXL Device Types", [Online]. Retrieved from the Internet: <https://www.synopsys.com/blogs/chip-design/introduction-cxl-device-types.html>, (Mar. 3, 2020), 7 pages.

* cited by examiner

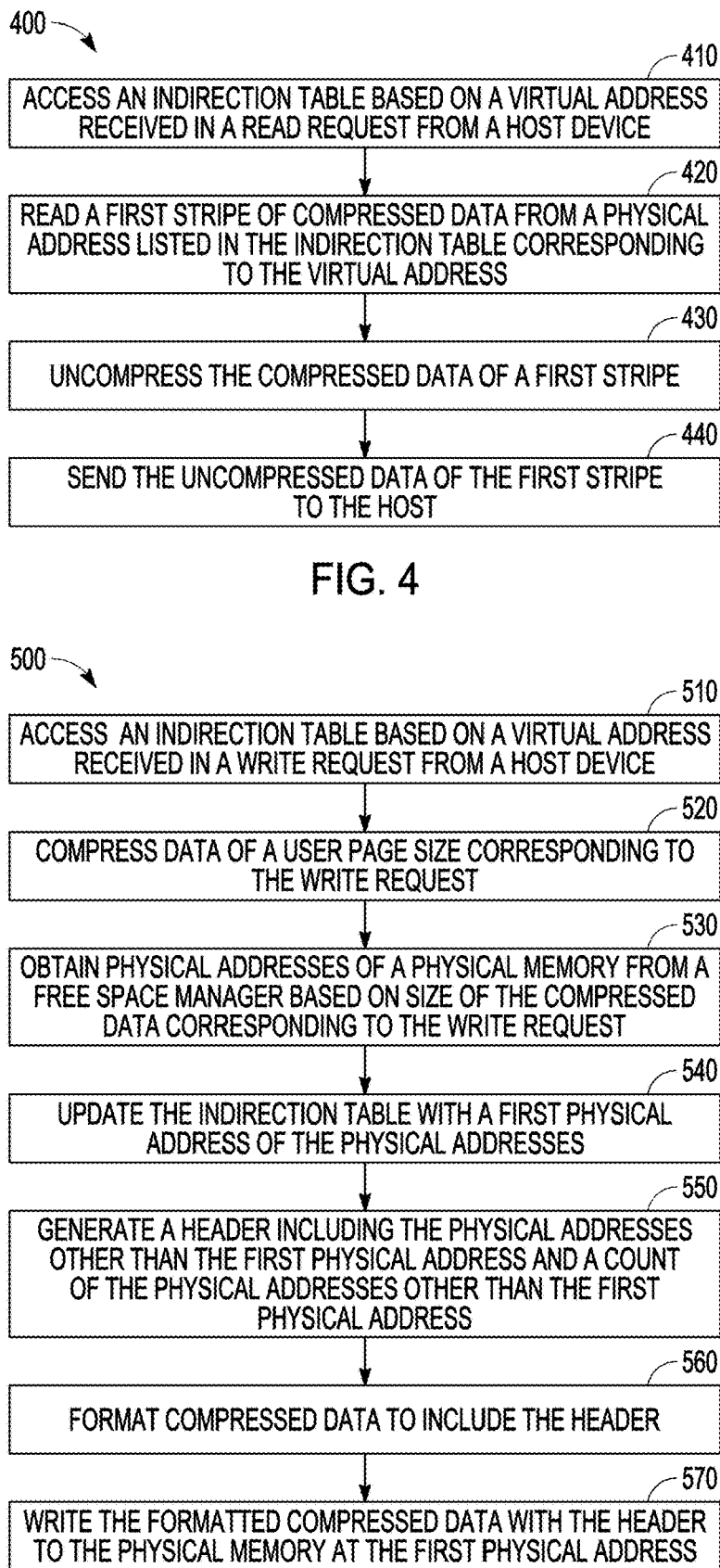

400

410
ACCESS AN INDIRECTION TABLE BASED ON A VIRTUAL ADDRESS RECEIVED IN A READ REQUEST FROM A HOST DEVICE

420
READ A FIRST STRIPE OF COMPRESSED DATA FROM A PHYSICAL ADDRESS LISTED IN THE INDIRECTION TABLE CORRESPONDING TO THE VIRTUAL ADDRESS

430
UNCOMPRESS THE COMPRESSED DATA OF A FIRST STRIPE

440
SEND THE UNCOMPRESSED DATA OF THE FIRST STRIPE TO THE HOST

510
ACCESS AN INDIRECTION TABLE BASED ON A VIRTUAL ADDRESS RECEIVED IN A WRITE REQUEST FROM A HOST DEVICE

520
COMPRESS DATA OF A USER PAGE SIZE CORRESPONDING TO THE WRITE REQUEST

530
OBTAIN PHYSICAL ADDRESSES OF A PHYSICAL MEMORY FROM A FREE SPACE MANAGER BASED ON SIZE OF THE COMPRESSED DATA CORRESPONDING TO THE WRITE REQUEST

540
UPDATE THE INDIRECTION TABLE WITH A FIRST PHYSICAL ADDRESS OF THE PHYSICAL ADDRESSES

550
GENERATE A HEADER INCLUDING THE PHYSICAL ADDRESSES OTHER THAN THE FIRST PHYSICAL ADDRESS AND A COUNT OF THE PHYSICAL ADDRESSES OTHER THAN THE FIRST PHYSICAL ADDRESS

560
FORMAT COMPRESSED DATA TO INCLUDE THE HEADER

570
WRITE THE FORMATTED COMPRESSED DATA WITH THE HEADER TO THE PHYSICAL MEMORY AT THE FIRST PHYSICAL ADDRESS

FIG. 5

DYNAMIC PAGE MAPPING USING HEADER TO IDENTIFY COMPRESSED DATA

PRIORITY APPLICATION

This application claims the benefit of priority to Indian Patent Application number 202311062639, filed Sep. 18, 2023, which is incorporated herein by reference in its entirety.

FIELD OF THE DISCLOSURE

Embodiments of the disclosure relate generally to electronic devices and, more specifically, to storage memory devices and operation thereof.

BACKGROUND

Memory devices are typically provided as internal, semiconductor, integrated circuits in computers or other electronic devices in a variety of manufactured products. There are many different types of memory, including volatile and non-volatile memory. Volatile memory requires power to maintain its data, and examples of volatile memory include random-access memory (RAM), dynamic random-access memory (DRAM), static RAM (SRAM), and synchronous dynamic random-access memory (SDRAM), among others. Non-volatile memory can retain stored data when not powered, and examples of non-volatile memory include flash memory, read-only memory (ROM), electrically erasable programmable ROM (EEPROM), erasable programmable ROM (EPROM), resistance variable memory, such as phase-change random-access memory (PCRAM), resistive random-access memory (RRAM), magnetoresistive random-access memory (MRAM), and three-dimensional (3D) XPoint™ memory, among others.

The various types of memories can be used in applications in which manufacturers of consumer products use architectures for memory devices, which architectures can include one or more memory subsystems having multiple individual storage memory medium in which the memory device interacts with a host device to store user data in the one or more memory subsystems. The host device and the memory devices can operate using one or more protocols that can include standardized protocols. Operation and properties of memory devices and other electronic devices in systems can be improved by enhancements to the procedures and design of these electronic devices for their introduction into the systems for which the electronic devices are intended.

BRIEF DESCRIPTION OF THE DRAWINGS

The drawings, which are not necessarily drawn to scale, illustrate generally, by way of example, but not by way of limitation, various embodiments discussed in the present document.

FIG. 4 is a flow diagram of features of an example method of reading data from a memory device, with the data being stored in the memory device as compressed data, according to various embodiments.

FIG. 5 is a flow diagram of features of an example method of writing data to a memory device, with the data being stored in the memory device as compressed data, according to various embodiments.

DETAILED DESCRIPTION

Figure 1:
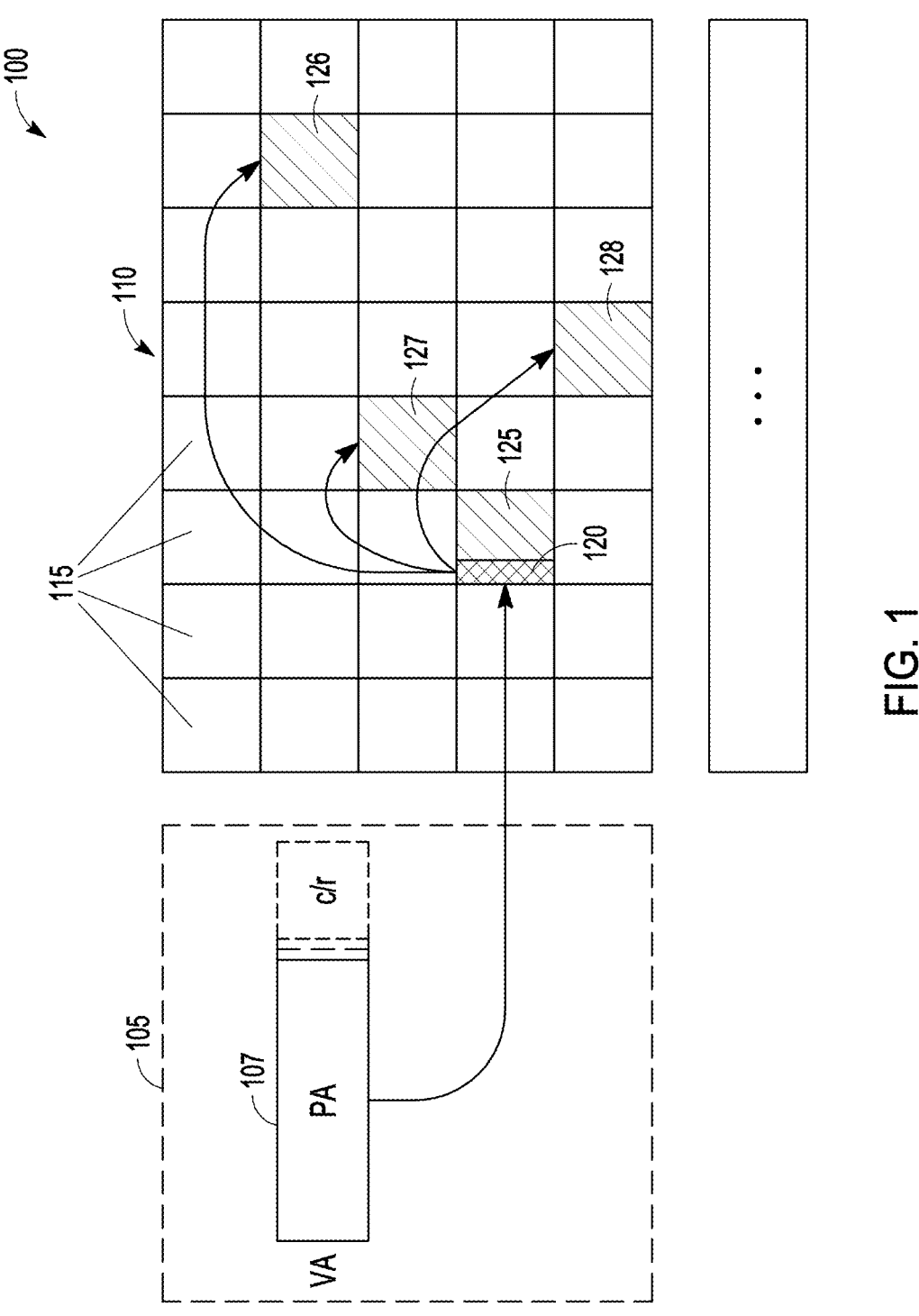
FIG. 1 is a representation of two parts of a mapping procedure of a dynamic mapping table of a memory device, according to various embodiments.

The following detailed description refers to the accompanying drawings that show, by way of illustration and not limitation, various embodiments in which an invention can be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

To improve physical space utilization in a memory device, a data compression feature may be implemented in the memory device to compress data received from a host. The memory device can include one or more memory media to store user data. This feature can be structured to compress data while writing the host data and decompress compressed data while reading in response to a host read request. The compression of user data can change the target capacity of the memory device and provide better physical capacity utilization compared to memory devices without compression. The compression can be characterized by a compression ratio, which compression ratio can depend on the nature of the block of data used as the basis for storing data in the memory device. Compression can be used to change the data block size for the data being stored. For an example unit block size of 4096 bytes, referred to as 4K bytes (4 KB), a compression can result in storing the data in units between a few bytes to 4 KB. In a conventional approach, an additional indirection would be used to locate the data blocks in the memory media of the memory device after compression.

The memory device can be realized in a number of different memory device architectures. For example, the compression can be conducted in, but is not limited to, a compute express link (CXL) memory device, a solid-state drive (SSD), or other memory device. One or more memory devices may be coupled to a host, for example a host computing device, to store data, commands, and/or instructions for use by the host while the computer or electronic system is operating. Data, commands, or instructions can be transferred between the host and the one or more memory devices during operation of a computing or other electronic system.

Various protocols or standards can be applied to facilitate communication between a host and one or more other devices such as memory devices, memory buffers, accelerators, or other input/output (I/O) devices. For example, an unordered protocol such as CXL can be used to provide high-bandwidth and low-latency connectivity. Other protocols can be used as an alternative to or in conjunction with CXL.

CXL is an open standard interconnect configured for high-bandwidth, low-latency connectivity between host devices and other devices such as accelerators, memory buffers, and other I/O devices. CXL was designed to facilitate high-performance computational workloads by supporting heterogeneous processing and memory systems. CXL enables coherency and memory semantics on top of peripheral component interconnect express (PCIe)-based I/O semantics for optimized performance.

CXL can be used in applications such as artificial intelligence, machine learning, analytics, cloud infrastructure, edge computing devices, communication systems, and elsewhere. Data processing in such applications can use various scalar, vector, matrix, and spatial architectures that can be deployed in a central processing unit (CPU), a graphics processing unit (GPU), a field-programmable gate array (FPGA), a digital signal processors (DSP), an application-specific integrated circuit (ASIC), other programmable logic devices, smart network interface cards (NICs), or other accelerators that can be coupled using a CXL link. A processing module, such as a CPU, can be realized as a host device or host processor in the architecture in which the CPU is structured.

CXL supports dynamic multiplexing using a set of protocols that includes I/O (CXL.io, based on PCIe), caching (CXL.cache), and memory (CXL.memory) semantics. CXL can be used to maintain a unified, coherent memory space between the CPU and any memory on the attached CXL device. This configuration allows the CPU and the CXL device to share resources and operate on the same memory region for higher performance, reduced data movement, and reduced software stack complexity. In an example, the CPU can be primarily responsible for maintaining or managing coherency in a CXL environment. Accordingly, CXL can be leveraged to help reduce device cost and complexity, as well as overhead traditionally associated with coherency across an I/O link.

CXL runs on PCIe physical layer (PHY) and provides full interoperability with PCIe. A CXL device can start link training with a PCIe generation 1 data rate and can negotiate CXL as its operating protocol if its link partner supports CXL. CXL can be used as an operating protocol, for example, using an alternate protocol negotiation mechanism defined in the PCIe 5.0 specification. Devices and platforms can thus more readily adopt CXL by leveraging the PCIe infrastructure and without having to design and validate the PHY, channel, channel extension devices, or other upper layers of PCIe.

CXL technology can maintain memory coherency between the CPU memory space and memory on attached devices, which enables resource sharing for higher performance, reduces software stack complexity, and lowers overall system cost. Three primary types of devices can employ a CXL interconnect protocol. Type 1 devices can include accelerators such as smart NICs that typically lack local memory. Via CXL, these type 1 devices can communicate with memory of the host processor to which it is coupled. Type 1 devices can use CXL.io+CXL.cache protocols. Type 2 devices can include GPUs, ASICs, and FPGAs that are equipped with instrumentalities such as, but not limited to, double data rate (DDR) memory or high bandwidth memory (HBM) and can use CXL to make the memory of the host processor locally available to an accelerator and make the memory of the accelerator locally available to the host processor. The type 2 devices can also be co-located in the same cache coherent domain and help boost heterogeneous workloads. Type 2 devices can use CXL.io+CXL.cache+CXL.memory protocols. Type 3 devices can include memory devices that can be attached via CXL to provide additional bandwidth and capacity to host processors. The type of memory is independent of the main memory of the host. Type 3 devices can use CXL.io+CXL.memory protocols.

Compression in a memory device, such as but not limited to a CXL memory device, can be implemented with a mechanism to locate blocks of data in storage media after compression. The ability to reference the data using a reference other than the value of the data itself, for example operating on the data through its memory address, is an indirection mechanism. An indirection table can contain entries that are pointers to the location or locations of the data in the storage media. A linear indirection table can be used for address translation of compressed data. A linear indirection table for a memory device can be arranged with entries for each address of a page of data provided by a host device. Such addresses and pages of data are provided by the host device independent of the management of data in the memory device. With respect to the memory device, the host supplied addresses and pages are virtual addresses (VAs) and virtual pages (VPs), which VAs are mapped by the memory device to physical addresses (PAS). A PA is an address that the memory device uses to point to a memory medium (for example, a memory die or a packaged memory die), row, and column to store one or more bits of data, where the pointing mechanism can inculcate a calculation dependent on the type of memory used for the memory medium.

In a memory device, a user page size can be set equal to 4 KB, with a VP structured as being equal to 64 contiguous PAs (64 B*64=4096 B (4 KB)) of the memory device. A media unit of the memory device can be defined as the smallest amount of data that can be written onto the memory device. The media unit can be set as 256 B. The media units can be referred to as stripes. For a user page size of 4 KB of user data, sixteen stripes can be used to store the user data. Other sizes for user pages and sizes for stripes can be used. In a first conventional approach or a first option to managing data compression in the memory device, a mapping table in the memory device can be implemented as a linear indirection table structured having one entry per user block (e.g., 4K). The entry can include a starting PA for a stripe of data in the storage media of the memory device and a count (specified number) of consecutive PAs following the starting PA to store the compressed data. Optionally, the entry for the starting PA can be an index, where the count identifies the next specified indexes. The index can be a pointer to a location in a table of stripes having PAs. This first option can provide a relatively small mapping table, but can lead to implementation of a defragmentation. Defragmentation is a process of freeing up storage space. In this first option, the defragmentation in the memory device can be challenging and complex. For example, in the first option, defragmentation can be used to create free continuous stripes of data, which may create complexity to a compression procedure. In a second conventional option, use of defragmentation can be avoided by having an entry for each VA in a linear indirection table that includes a PA for each stripe of data written corresponding to a given VA. Optionally, the entry for the PAs associated with a given VA can be a set of indexes, where each index can point to a location in a table of stripes having a different PA for each index. However, in this second option, this indirection table is a mapping table that can have a significant increase in size as compared to the first option. For a user page size of 4 KB and a stripe size of 256 B, the mapping table size of the second option can be sixteen times the mapping table size of the first option.

In various embodiments, a dynamic mapping table translating a VA to PAs in a memory storage can be implemented for data that can be compressed. The mapping table size can depend on the compression ratio of the data to be written to the memory storage. If a page can be compressed, the dynamic mapping table can have an entry to hold a PA of a starting stripe of compressed data, which starting stripe of data can be used to identify the PA of each stripe, in addition to the starting stripe, used to store the compressed data on the given media. The mapping procedure can be divided into two parts. The first of the two parts can use a linear table as the dynamic mapping table and the second of the two parts can use a header formatted with the compressed data that is stored in the physical memory of the memory device at a PA identified in the linear table.

FIG. 1 is a representation 100 of two parts of a mapping procedure (scheme) of a dynamic mapping table of a memory device. Representation 100 shows an entry 107 of a linear table 105 for data of a VP corresponding to a VA. Entry 107 includes the PA of a first stripe 125 of data corresponding to the VP along with a flag (c/r) that represents the VP as being compressed or uncompressed in the memory device. If the flag identifies no compression, the stripes of data are uncompressed data having the VA, where each stripe has a corresponding PA in linear table 105. If the flag identifies compression, the stripes of data are compressed data and a single PA can be listed in linear table 105 to manage the stripes of data, where the compressed data results from compressing data corresponding to the VP of data from a host with the VA.

Representation 100 shows a physical memory 110 having multiple blocks 115 for storing data. Each block can be set to a stripe of data of a fixed size, for example 256 B. Other fixed sizes can be implemented according to the architecture of the given memory medium. In response to the flag of entry 107 identifying compression, data for first stripe 125 is formatted with a header 120. Header 120 of the data of the first stripe is constructed with information about other data stripes 126, 127, and 128 of the compressed VP. The compressed data of a VP is not limited to storage in four stripes, which is used in the example of FIG. 1. The information in header 120 can include the PAs of data stripes 126, 127, and 128, where the PAs of data stripes 126, 127, and 128 are not included in linear table 105. These other data stripes 126, 127, and 128 do not include a header formatted such as the format of header 120 of the first stripe 125. In response to the flag identifying that the data is uncompressed, data of the VP can be stored as uncompressed data that is formatted without a header and stored in multiple blocks 115 in physical memory 110. These multiple blocks can correspond to contiguous PAs for stripes of physical memory 110, where the contiguous PAs can be stored in linear table 105. An indirection table for a given VA of data that is not compressed can be implemented according to conventional first or second options previously discussed. Depending on the memory architecture, compressed data or uncompressed data for storage in physical memory 110 may also be formatted with a header or elements of a header to contain information other than the dynamic mapping information.

Figures 2, 3:
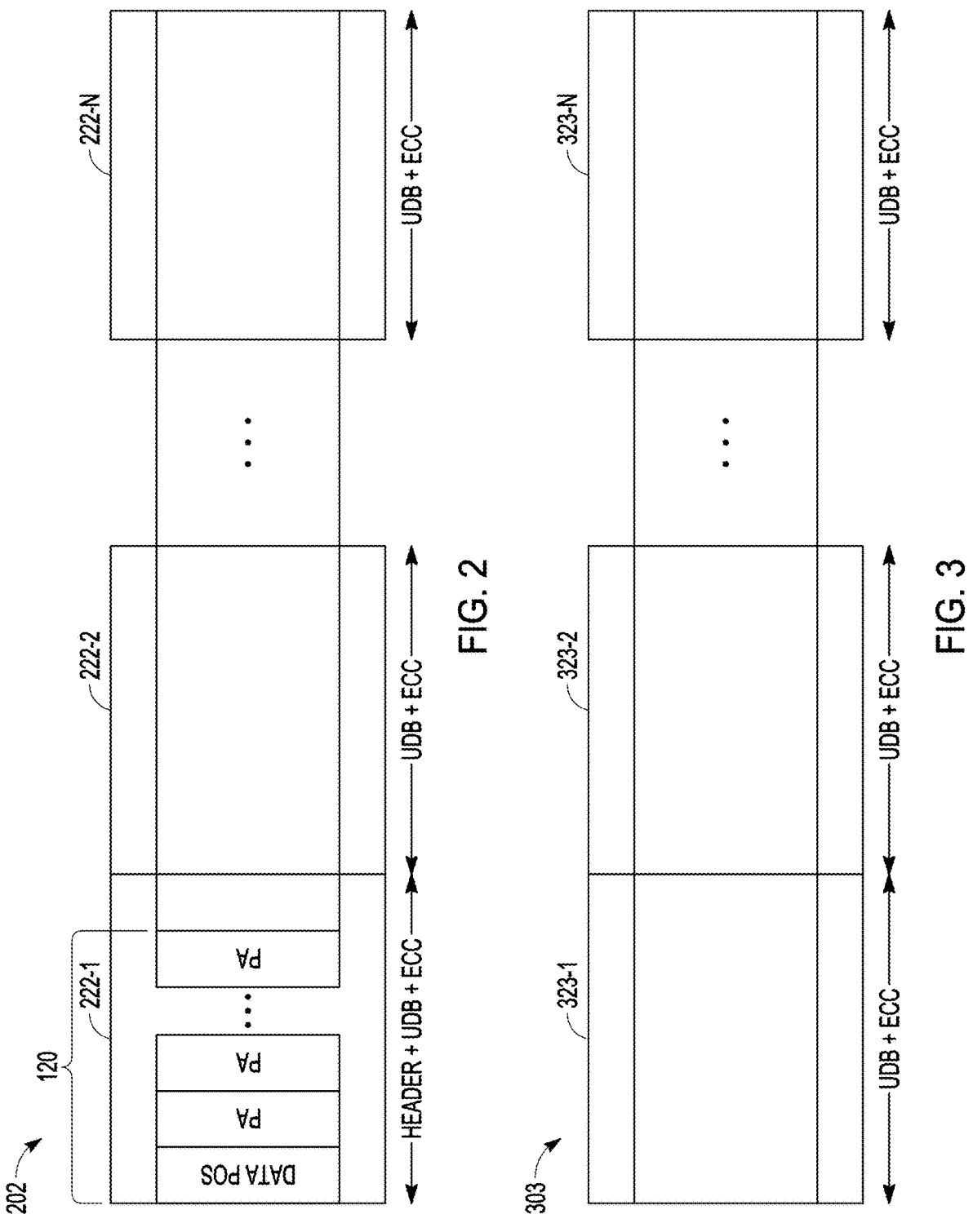
FIG. 2 illustrates a data format that can be implemented in the dynamic mapping scheme of FIG. 1, according to various embodiments.
FIG. 3 illustrates another data format that can be implemented in the dynamic mapping scheme of FIG. 1, according to various embodiments.

FIG. 2 illustrates a data format 202 that can be implemented in the dynamic mapping scheme of FIG. 1. Data format 202 has a header plus data format. Data format 202 can be generated when the c/r flag of entry 107 identifies that a received VA is compressible. Data format 202 can be generated for the first stripe of compressed data, where in the dynamic mapping scheme, the first stripe is generated having header 120, while other stripes of the compressed data can be formatted without header 120. The PA stored in entry 107 with c/r identifying compressed of the VP is the PA of the first stripe in physical memory 110. Data format 202 can be generated with a fixed data structure.

Data format 202 can include sections 222-1, 222-2 . . . 222-N of data for first stripe 125 of FIG. 1. Each of these sections can have a fixed number of bytes depending on the architecture of a given memory device. Considering a memory device using a 4K VP size and a 256 B stripe size, N can be set to four and the size of each of sections 222-1, 222-2 . . . 222-N can be set to sixty-four bytes. Section 222-1 can include header 120, a user data block (UDB), and error correction code (ECC). Each of sections 222-1, 222-2 . . . 222-N can include a UDB and a ECC. The data structure of data format 202 can include section 222-1 as a first section having a field to contain a fixed number of bits identifying a data position that directs where in data format 202, the compressed data begins. The fixed number of bits can be predefined before operation of the given memory device. The data position field is followed by fields containing the PAs of the stripes to contain compressed data of the VP other than the first stripe. The size of the data position field and the PA fields depends on the architecture of the given memory device. Considering a 4K VP size and 256 B stripe size, the data position field can be generated as the first four bits of header 120 followed by PA fields of four bytes. The data position field can store the data start position, and subsequent bits ($5^{th}$ bit onward) in header 120 can store the PA addresses of subsequent stripes. The data position identifying the start of data can be realized as the number of additional PAs to store the compressed data of the VP. With the PA addresses of subsequent stripes in header 120, the PA addresses of subsequent stripes are not stored in linear table 105. The use of the header to store these subsequent PAs provides a dynamic mapping scheme that can reduce the size of a linear table such as linear table 105.

FIG. 3 illustrates a data format 303 that can be implemented in the dynamic mapping scheme of FIG. 1. With the PA addresses of subsequent stripes stored in header 120, the subsequent stripes can be generated without including a header structured similar to header 120. The data structure of data format 303 can be generated as an all-data format. The all-data format for a stripe has only compressed user data. Data format 303 can include sections 323-1, 323-2 . . . 323-N and each of sections 323-1, 323-2 . . . 323-N can include a UDB and a ECC. Data format 303 can be structured with the same size as data format 202, where a header is not generated in section 323-1. In addition to being used for compressed data corresponding to the subsequent PAs in header 120 of data format 202, data format 303 can be used for uncompressed data that has corresponding PAs in linear table 105 of FIG. 1.

FIG. 4 is a flow diagram of features of an embodiment of an example method 400 of reading data from a memory device, with the data being stored in the memory device as compressed data. A controller of the memory device can be used to manage providing the data from compressed data and manage the read procedure. The read procedure can be managed by processing circuitry of the controller that can execute instructions stored in the memory device. The controller can be realized as one or more processing devices that can execute instructions stored in the memory device. At 410, an indirection table is accessed based on a VA received in a read request from a host device. Accessing the indirection table can include loading the indirection table if the indirection table is not cached.

At 420, a first stripe of compressed data is read from a physical memory at a PA listed in the indirection table corresponding to the VA. The first stripe of compressed data includes a header and the compressed data of the first stripe.

At 430, the compressed data of the first stripe is uncompressed, generating uncompressed data of the first stripe. The header of the first stripe can be fetched for decomposition after uncompressing the first stripe, where information in the header can be further processed in operating on the read request. At 440, the uncompressed data of the first stripe is sent to the host.

Variations of method 400 or methods similar to method 400 can include a number of different embodiments that may be combined depending on the application of such methods and/or the architecture of systems including an electronic device in which such methods are implemented. Such methods can include reading a next stripe of compressed data from a physical memory at a PA retrieved from the header of the first stripe of compressed data. The retrieved compressed data of the next stripe can be uncompressed, generating uncompressed data of the next stripe. The uncompressed data from the next stripe along with the uncompressed data of the first stripe can be sent to the host.

Variations of method 400 or methods similar to method 400 can include consecutively reading stripes of compressed data having PAs in the header of the first stripe, after uncompressing the first stripe of compressed data. The compressed data of the stripes having PAs in the header of the first stripe can be uncompressed and copied to a cache along with the uncompressed data of the first stripe. The read request can be a series of read requests and the uncompressed data of the stripes having PA in the header of the first stripe along with the uncompressed data from the first stripe can be copied to read buffers for the series of read requests.

FIG. 5 is a flow diagram of features of an embodiment of an example method 500 of writing data to a memory device, with the data being stored in the memory device as compressed data. A controller of the memory device can be used to manage providing the compressed data and the write procedure. The write procedure can be managed by processing circuitry of the controller that can execute instructions stored in the memory device. The controller can be realized as one or more processing devices that can execute instructions stored in the memory device. At 510, an indirection table is accessed based on a VA received in a write request from a host device. Accessing the indirection table can include loading the indirection table for processing. The indirection table can be loaded from a component of the memory device such as a storage device of the memory device.

At 520, data of a user page size corresponding to the write request is compressed. The user page size can be 4 KB. At 530, PAs of a physical memory of the memory device are obtained from a free space manager (FSM) based on size of the compressed data corresponding to the write request. These PAs can be PAs freed for use by execution of an invalidation process by the FSM. The invalidation process identifies currently used PAs as no longer associated with valid data and identifies these PAs as available for future use. The stripes corresponding to these freed PAs can be overwritten with data provided in a newly received write request. At 540, the indirection table is updated with a first PA of the PAs provided by the FSM. The update can include setting a flag in the entry updated with the first PA, where the flag indicates that the data of the first PA is compressed data.

At 550, a header is generated. The generated header includes the PAs other than the first PA and a count of the PAs other than the first PA. At 560, compressed data is formatted to include the header. At 570, the formatted compressed data with the header is written to the physical memory at the first PA. Remaining compressed data corresponding to the write request can be written to the PAs other than the first PA that are identified in the data structure for the first stripe.

Variations of method 500 or methods similar to method 500 can include a number of different embodiments that may be combined depending on the application of such methods and/or the architecture of systems including an electronic device in which such methods are implemented. Such methods can include accessing the indirection table in a cache, where the indirection table in the cache includes a first PA corresponding to the VA. Contents of the cache regarding the PAs for the compressed data can initiate operation of the first PA to modify the set of PAs for writing the compressed data.

Variations of method 500 or methods similar to method 500 can include operations of the FSM to free-up PAs for write operations. Such operations can include obtaining a PA from the indirection table corresponding to a VA, where the indirection table has a flag identifying a stripe of data at the PA is compressed data. A header can be read from the stripe corresponding to the PA. In response to reading the header, the FSM can set the PA and additional PAs listed in the header free for future use in storing user data.

A dynamic mapping scheme for memory devices as discussed herein can be implemented in a number of different applications of electronic devices. Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc. Electronic devices can be broken down into several main components: a processor (e.g., a CPU or other main processor); memory (e.g., one or more volatile or non-volatile RAM memory device, such as DRAM, mobile or low-power DDR SDRAM, etc.); and a storage device (e.g., non-volatile memory (NVM) device, such as flash memory, ROM, an SSD, an MMC, or other memory card structure or assembly, etc.). Such electronic devices can be associated with a range of architectures including a CXL system and managed memory systems. SSD, Universal Flash Storage (UFS™), and embedded MultiMediaCard (eMMC™) devices can be included in managed memory systems that also can include processing circuitry such as one or more of memory processing devices, direct memory access (DMA) controllers, and flash memory interface circuitry to manage the access to physical memory media. Many of such electronic devices can include a user interface (e.g., a display, touch-screen, keyboard, one or more buttons, etc.), a GPU, a power management circuit, a baseband processor or one or more transceiver circuits, etc.

Figure 6:
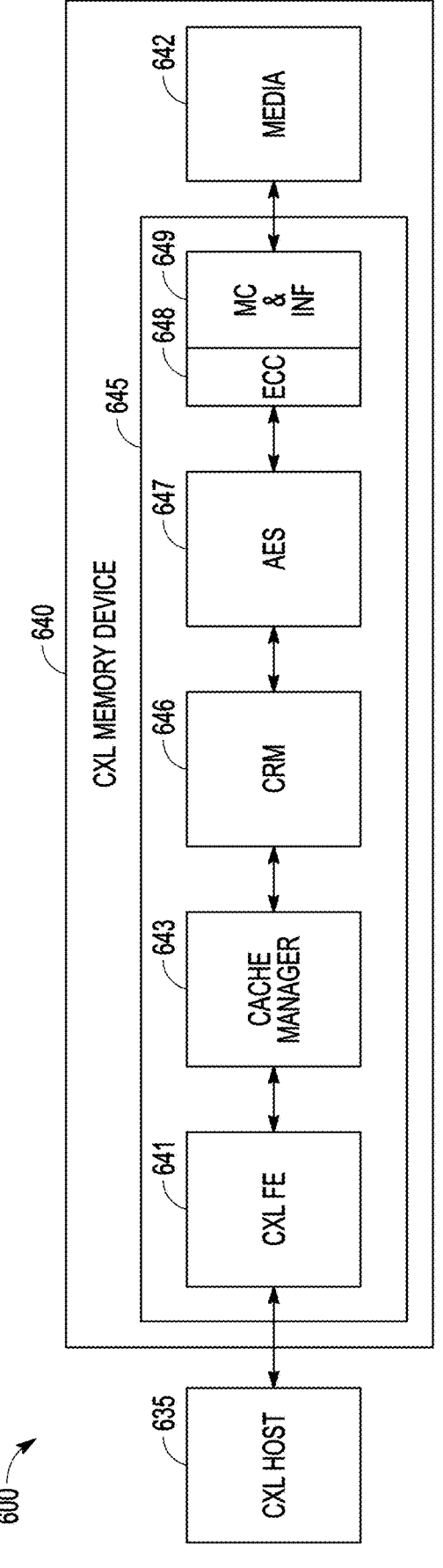
FIG. 6 illustrates a block diagram of example component features of a compute express link system that includes a dynamic page mapping with compression of user data, according to various embodiments.

FIG. 6 is a block diagram of an embodiment of example component features of a CXL system 600 that includes dynamic page mapping with compression of user data. CXL system 600 can include a CXL host 635 and a CXL memory device 640 that can operate in accordance with CXL protocols. CXL memory device 640 can include a controller 645 that interfaces with CXL host 635 and with media 642 of CXL memory device 640 to write user data directed from host to media 642 using one or more write requests and to read user data from media 642 for CXL host 625 using one or more read requests. The execution of write requests and read requests can be performed using the dynamic page mapping scheme with compression of user data.

Controller 645 can include a CXL front end (FE) 641 to interface with CXL host 635 using CXL protocols and a cache manager 643 to manage flow of user data between associated with read and write requests received form CXL host 635. The user data can be stored in media 642, where media 642 can be structured as one or more memory structures arranged as channels of data storage. The user data can be processed with an Advanced Encryption Standard (AES) 647 and ECC 648. Processing of user data with ECC 648 by a memory controller (MC) and interface (INF) 649 can control input and output of the user data from media 642. The user data operated on by AES 647, ECC 648, and MC & INF 649 can be compressed data. Compressing user data and uncompressing user data can be controlled by a compression region manager (CRM) 646.

Figure 7:
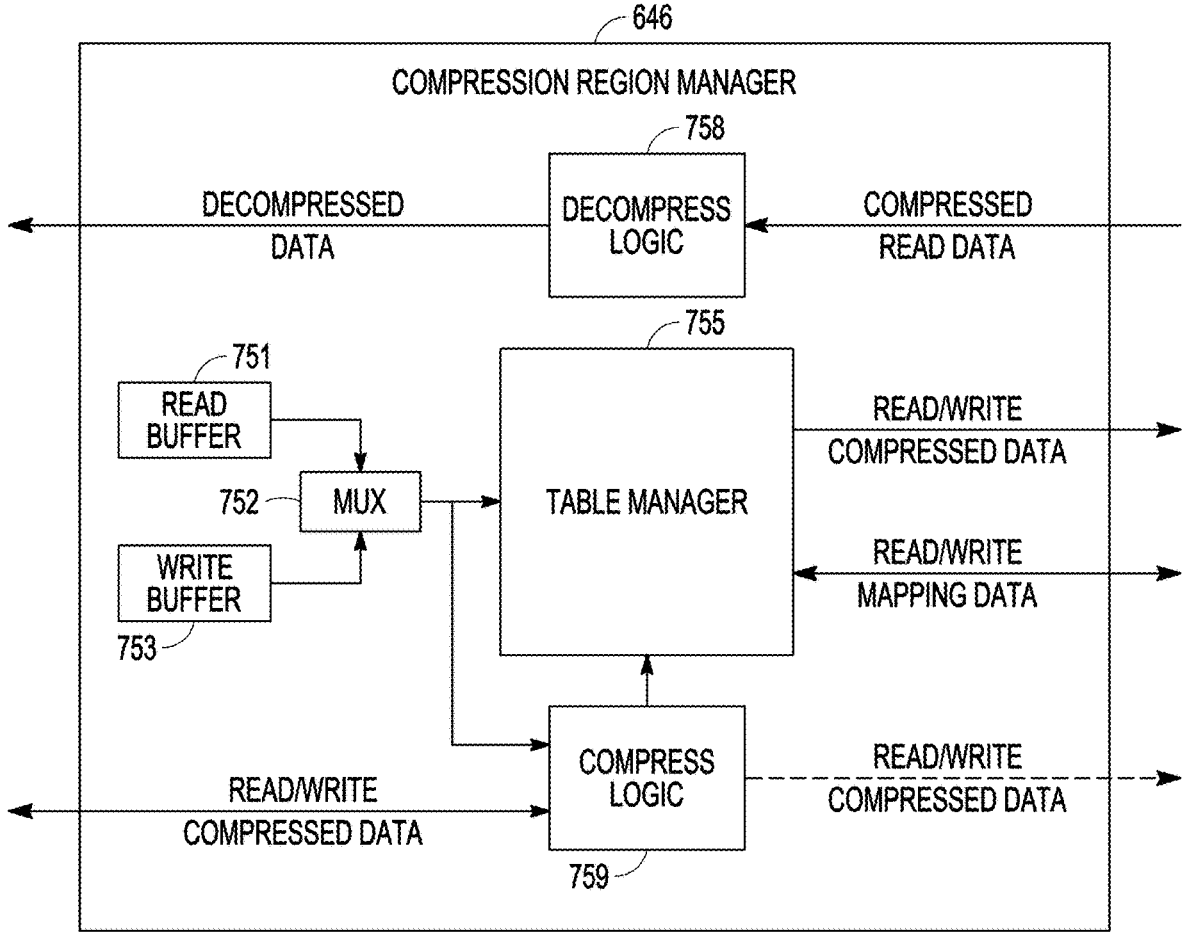
FIG. 7 illustrates an example of the compress region manager of the compute express link controller of FIG. 6, according to various embodiments.

FIG. 7 illustrates an embodiment of an example of CRM 646 of CXL controller 645 of FIG. 6. CRM 646 can include a read buffer 751 to handle user data for a request and a write buffer 753 to handle user data for a write request. Read buffer 751 and write buffer 753 can be first in, first out (FIFO) structures that can be realized in a number of formats including one or more registers or one or more other buffering structures that can cache user data. Data from read buffer 751 and write buffer 753 can be directed to a table manager 755 and compress logic 759 by a multiplexer (MUX) 752. CRM 646 also includes decompress logic 758 to uncompress, using logic circuitry within decompress logic 758, received compressed read data, where the compressed read data is compressed data from media 642 received in response to a read request. Compress logic 759 can use received compression ratio data to compress input user data using logic circuitry within compress logic 759, if the input user data meets the criterion for compression. The criterion can be provided in the compression ratio data or from table manager 755. Compress logic 759 can provide the compressed data to table manager 755 that can output the compressed data or compress logic 759 can, alternatively or in conjunction with table manager 755, output the compressed data. Compress logic 759 can also provide compression ratio data for subsequent operations associated with compression. Compress logic 759 may be structured to make compression calculations. Table manager 755, in addition to operating with respect to output of read/write compressed data, can operate on read/write mapping data to receive and output the read/write mapping data. Table manager 755 can operate to manage a dynamic mapping scheme with compressed data as taught herein.

Figure 8:
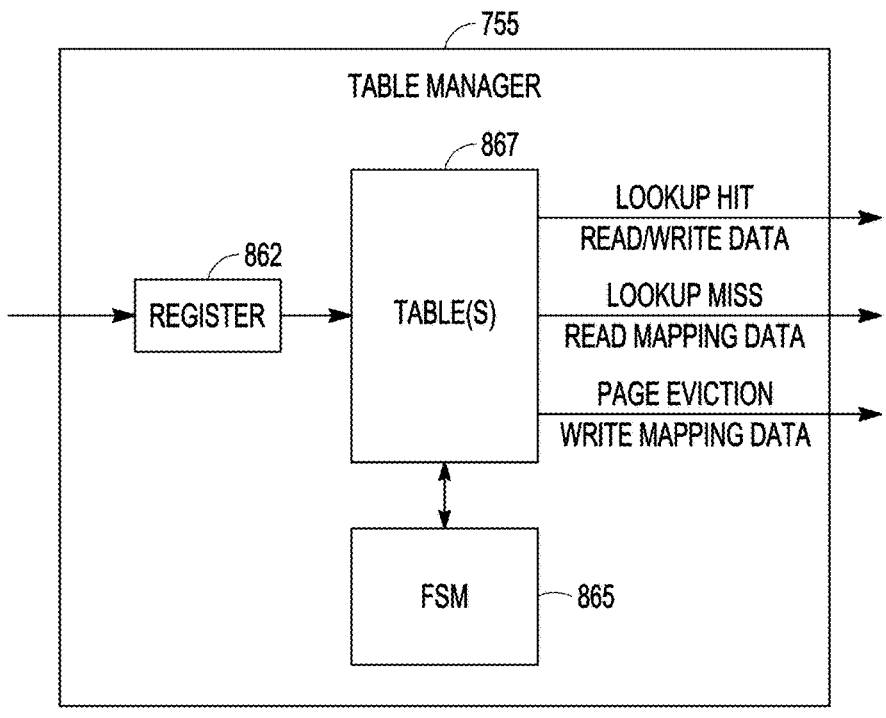
FIG. 8 illustrates an embodiment of an example of the table manager of the compress region manager of FIG. 7, according to various embodiments.

FIG. 8 illustrates an embodiment of an example of table manager 755 of CRM 646 of FIG. 7. Table manager 755 can include register 862. Register 862 can be a FIFO structure that can be realized in a number of formats including one or more register structures or one or more other buffering structures that can hold data. Table manager 755 can include one or more tables (table(s)) 867. Table(s) 867 can include a table for mapping and looking-up information on cached data along with updating maps associated with read and write requests. Table(s) 867 can operate with a FSM 865 to make PAs available for use in an invalidation process, including eviction of pages of data from identified memory locations in response to a write operation, as taught herein. Table(s) 867 can include indirection tables for mapping and updating information translating received VA with associated PAs as taught herein. Data that is read frequently can be cached and table(s) 867 can be used to determine if such data is currently part of a read or write (read/write) request. Determination that current data of a read/write request is cached is a hit and determination that current data of a read/write request is not cached is a miss. Table(s) 867 can provide data from looking-up hit data, data from looking-up miss data, and data of page eviction associated with mapping of write operations.

Figure 9:
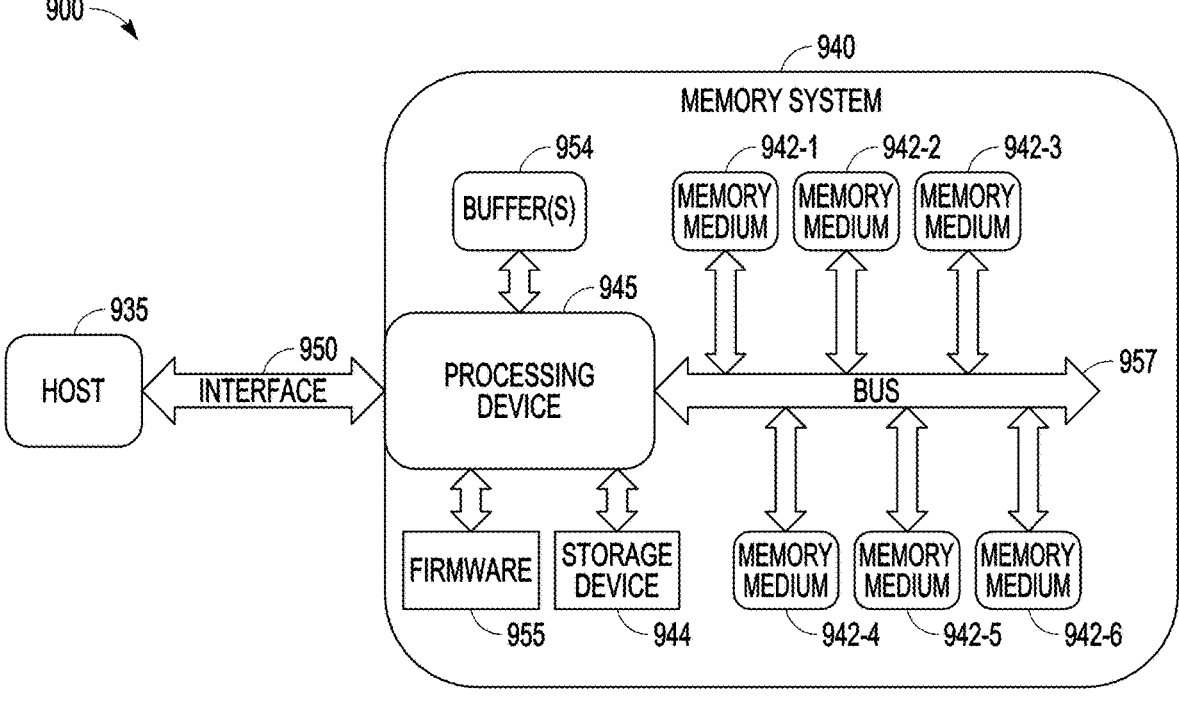
FIG. 9 is a block diagram of an example system including a host that operates with a memory device having one or more memory media that can implement a dynamic page mapping scheme with compression of user data, according to various embodiments.

FIG. 9 is a block diagram of an embodiment of example system 900 including a host 935 that operates with a memory device 940 having one or more memory media that can implement a dynamic page mapping scheme for compression of user data in applications for which memory device 940 is implemented. The dynamic page mapping scheme can be implemented using techniques associated with the mapping procedures associated with FIG. 1, the data structures of FIGS. 2 and 3, the methods of FIGS. 4 and 5, and functions associated with the structure of FIGS. 6-8. System 900 and its components can be structured in a number of different arrangements. For example, system 900 can be arranged with a variation of the type of components that comprise host 935, an interface 950, memory device 940, memory media 942-1, 942-2, 942-3, 942-4, 942-5, and 942-6, a processing device 945, and a bus 957.

Host 935 is coupled to memory device 940 by an interface 950, where host 935 is a host device that can comprise one or more processors, which can vary in type compatible with interface 950 and memory device 940. Memory device 940 can include a processing device 945 coupled to memory media 942-1, 942-2, 942-3, 942-4, 942-5, and 942-6 by a bus 957, where each memory medium has one or more arrays of memory cells. Memory media 942-1, 942-2, 942-3, 942-4, 942-5, and 942-6 may be realized as memory structures that can be selected from different types of memory. Though six memory media are shown in FIG. 9, memory device 940 can be implemented with more or fewer than six memory media, that is, memory device 940 can comprise one or more memory media. The memory media can be realized in a number of formats including, but not limited to, a plurality of memory dies or a plurality of packaged memory dies.

Processing device 945 can include processing circuitry or be structured as one or more processors. Processing device 945 can be structured as a memory system controller for memory device 940. Processing device 945 can be implemented in a number of different formats. Processing device 945 can include or be structured as one or more types of processors compatible with memory media 942-1, 942-2, 942-3, 942-4, 942-5, and 942-6. Processing device 945 can include processing circuitry that can be structured with a DSP, an ASIC, other type of processing circuit, including a group of processors or multi-core devices, or combinations thereof.

Memory device 940 can comprise firmware 955 having code executable by processing device 945 to at least manage the memory media 942-1, 942-2, 942-3, 942-4, 942-5, and 942-6. Firmware 955 can reside in a storage device of memory device 940 coupled to processing device 945. Firmware 955 can be coupled to the processing device 945 using bus 957 or some other interface on the memory device 940. Alternatively, firmware 955 can reside in processing device 945 or can be distributed in memory device 940 with firmware components, such as but not limited to code, including one or more components in processing device 945. Firmware 955 can include code having instructions, executable by processing device 945, to operate on memory media 942-1, 942-2, 942-3, 942-4, 942-5, and 942-6. The instructions can include instructions to execute operations to store user data as compressed data in one or more of memory media 942-1, 942-2, 942-3, 942-4, 942-5, and 942-6 using a dynamic mapping scheme as taught herein.

Memory device 940 can include a storage device 944 that can be implemented to provide data or parameters used in maintenance of memory device 940. Storage device 944 can include one or more of a non-volatile memory structure or a RAM. Though storage device 944 is external to processing device 945 in memory device 940 in FIG. 9, storage device 944 may be integrated into processing device 945. Storage device 944 can be coupled to bus 957 for communication with other components of memory device 940. Alternatively, storage device 944 can be coupled with processing device 945 in which processing device 945 handles communications between storage device 944 and other components of the memory device 940. Storage device 944 can be coupled to bus 957 and to processing device 945.

Each of memory media 942-1, 942-2, 942-3, 942-4, 942-5, 942-6, firmware 955, storage device 944, and other memory structures of memory device 940 are implemented as machine-readable medium. Non-limiting examples of machine-readable media can include solid-state memories, optical media, and magnetic media. Specific examples of non-transitory machine-readable media can include non-volatile memory, such as semiconductor memory media (e.g., EPROM, EEPROM) and flash memory devices; magnetic disks, such as internal hard disks and removable disks; magneto-optical disks; and compact disc-ROM (CD-ROM) and digital versatile disc-read only memory (DVD-ROM) disks.

Firmware 955, storage device 944, or other components of memory device 940 can include a mapping table having an entry location to associate a virtual page with a PA of a first stripe of data of the virtual page along with a flag, the flag identifying data of the virtual page as compressed or uncompressed. The mapping table can be structured similar to mapping table 105 of FIG. 1. Processing device 945 can be implemented as a controller, responsive to a flag in a table in memory device 940 identifying the data of the virtual page being compressed, to generate a format of compressed data of the first stripe with a header. The header can include a count of additional PAs to store compressed data of the virtual page and the additional PAs.

Firmware 955, storage device 944, or other components of memory device 940 can have instructions, executable by processing device 945, to operate on user data to store the user data in one or more of memory media 942-1, 942-2, 942-3, 942-4, 942-5, and 942-6 in a compressed format. Firmware 955, storage device 944, or other components of memory device 940 can have instructions, executable by processing device 945, to operate on compressed user data to read and generated uncompressed user data from one or more of memory media 942-1, 942-2, 942-3, 942-4, 942-5, and 942-6. Compressed formats can be generated similar to or identical to the formats of FIGS. 2 and 3 defining data structures.

Processing device 945 can execute instructions stored on one or more components in memory device 940, which instructions, when executed by processing device 945, cause memory device 940 to perform operations. The operations can include operations of method 400, method 500, methods similar to method 400 or method 500, and functions of structures associated with FIGS. 6-8. The operations can include operations to read data from physical memory of one or more of memory media 942-1, 942-2, 942-3, 942-4, 942-5, and 942-6, where the data is stored in compressed format. The operations can include accessing an indirection table in memory device 940 based on a VA received in a read request from host 935. The executed operations can include accessing the indirection table by loading the indirection table if the indirection table is not cached. A first stripe of compressed data can be read from a physical memory at a PA listed in the indirection table corresponding to the VA, where the first stripe of compressed data includes a header and the compressed data. The operations can include uncompressing the compressed data of the first stripe and sending the uncompressed data of the first stripe to the host 935.

Operations executed by processing device 945 can include reading a next stripe of compressed data at a PA retrieved from the header of the first stripe of compressed data. The header of the first stripe can be fetched for decomposition after uncompressing the first stripe. The compressed data of the next stripe can be uncompressed and sent along with the uncompressed data of the first stripe to host 935. Compressed data of stripes having PAs in the header of the first stripe can be consecutively read after uncompressing the first stripe of compressed data.

Operations executed by processing device 945 can include uncompressing the compressed data of the stripes having PA in the header of the first stripe and copying the uncompressed data of the stripes having PA in the header of the first stripe to a cache along with the uncompressed data of the first stripe.

A read request executed by processing device 945 operating instructions stored in memory device 940 can be a series of read requests. The uncompressed data of the stripes having PA in the header of the first stripe along with the uncompressed data from the first stripe can be copied to read buffers for the series of read requests. The read buffers can be realized by storage device 944 or circuitry of processing device 945.

Processing device 945 can execute instructions stored on one or more components in memory device 940, which instructions, when executed by processing device 945, cause memory device 940 to perform operations. The operations can include operations to write data to physical memory of one or more of memory media 942-1, 942-2, 942-3, 942-4, 942-5, and 942-6 in compressed format. The operations can include accessing an indirection table based on a VA received in a write request from host 935. The indirection table can be accessed by loading the indirection table for processing or accessing the indirection table from a cache, where the indirection table has an entry of a PA corresponding to the VA.

Operations executed by processing device 945 can include compressing data of a user page size corresponding to the write request and obtaining PAs of a physical memory from a FSM based on size of the compressed data corresponding to the write request. The user page size can be, but is not limited to, 4 KB. The FSM can be realized by instrumentality, circuitry, and stored instructions, of firmware 955, The indirection table can be updated with a first PA of the PAs obtained from the FSM. Executed operations can include generating a header, where the header includes the PAs other than the first PA and a count of the PAs other than the first PA. The compressed data can be formatted to include the header. The formatted compressed data can be written with the header to the physical memory at the first PA. Operations executed by processing device 945 can include writing remaining compressed data corresponding to the write request to the physical memory at the PAs other than the first PA.

Operations executed by processing device 945 can include the FSM freeing PAs for write operations. The operations can include obtaining a PA from the indirection table corresponding to the VA, where the indirection table has a flag identifying a stripe of data at the PA is compressed data. A header can be read from the stripe that corresponds to the PA. The FSM can free the PA and additional PAs listed in the header for future use.

The following are example embodiments of systems, devices, and methods, in accordance with the teachings herein.

An example memory device 1 can comprise a mapping table having an entry location to associate a VP with a PA of a first stripe of data of the VP along with a flag, the flag identifying data of the VP as compressed or uncompressed; and a controller, responsive to the flag identifying the data of VP being compressed, to generate a format of compressed data of the first stripe with a header, the header including a count of additional PAs to store compressed data of the VP and the additional PAs.

An example memory device 2 can include features of example memory device 1 and can include the additional PAs being PAs of additional stripes of the compressed data of the VP.

An example memory device 3 can include features of example memory device 2 and any of the preceding example memory devices and can include the additional stripes of data of the VP having a format without a header.

An example memory device 4 can include features of example memory device 3 and any of the preceding example memory devices and can include the format including a user data block and an ECC following the count of additional PAs.

An example memory device 5 can include features of any of the preceding example memory devices and can include the header having a predefined format dependent on size of the first stripe.

An example memory device 6 can include features of any of the preceding example memory devices and can include a FSM to make available PAs to write data from a host to a memory subsystem of the memory device.

An example memory device 7 can include features of any of the preceding example memory devices and can include a CXL type 3 memory device.

In an example memory device 8, any of the memory devices of example memory devices 1 to 7 may include memory devices incorporated into an electronic apparatus further comprising a host processor and a communication bus extending between the host processor and the memory device.

In an example memory device 9, any of the memory devices of example memory devices 1 to 8 may be modified to include any structure presented in another of example memory device 1 to 8.

In an example memory device 10, any apparatus associated with the memory devices of example memory devices 1 to 9 may further include a machine-readable storage device configured to store instructions as a physical state, wherein the instructions may be used to perform one or more operations of the apparatus.

In an example memory device 11, any of the memory devices of example memory devices 1 to 10 may be operated in accordance with any of the below example methods 1 to 20.

An example method 1 can comprise accessing an indirection table based on a VA received in a read request from a host device; reading a first stripe of compressed data from a PA in the indirection table corresponding to the VA, the first stripe of compressed data including a header and the compressed data; uncompressing the compressed data of the first stripe, generating uncompressed data of the first stripe; and sending the uncompressed data the first stripe to the host.

An example method 2 can include features of example method 1 and can include reading a next stripe of compressed data at a PA retrieved from the header of the first stripe of compressed data; uncompressing the compressed data of the next stripe, generating uncompressed data of the next stripe; and sending the uncompressed data of the next stripe along with the uncompressed data of the first stripe to the host.

An example method 3 can include features of any of the preceding example methods and can include consecutively reading stripes of compressed data having PAs in the header of the first stripe, after uncompressing the first stripe of compressed data.

An example method 4 can include features of method 3 and any of the preceding example methods 1-2 and can include uncompressing the compressed data of the stripes having PAs in the header of the first stripe and copying the uncompressed data of the stripes having PAs in the header of the first stripe to a cache along with the uncompressed data of the first stripe.

An example method 5 can include features of method 4 and any of the preceding example methods 1-3 and can include the read request being a series of read requests and the uncompressed data of the stripes having PAs in the header of the first stripe along with the uncompressed data from the first stripe are copied to read buffers for the series of read requests.

An example method 6 can include features of example method 5 and any of the preceding example methods and can include fetching the header of the first stripe for decomposition after uncompressing the first stripe.

An example method 7 can include features of any of the preceding example methods and can include accessing the indirection table to include loading the indirection table if the indirection table is not cached.

In an example method 8, any of the example methods 1 to 7 may be performed in operating an electronic apparatus further comprising a host processor and a communication bus extending between the host processor and the memory device.

In an example method 9, any of the example methods 1 to 8 may be modified to include operations set forth in any other of example methods 1 to 8.

In an example method 10, any of the example methods 1 to 9 may be implemented at least in part through use of instructions stored as a physical state in one or more machine-readable storage devices.

An example method 11 can include features of any of the preceding example methods 1 to 10 and can include performing functions associated with any features of example memory devices 1 to 11.

An example method 12 can comprise accessing an indirection table based on a VA received in a write request from a host device; compressing data of a user page size corresponding to the write request; obtaining PAs from a FSM based on size of the compressed data corresponding to the write request; updating the indirection table with a first PA of the PAs; generating a header including the PAs other than the first PA and a count of the PAs other than the first PA; formatting compressed data to include the header; and writing the formatted compressed data with the header to the first PA.

An example method 13 can include features of example method 12 and can include writing remaining compressed data corresponding to the write request to the physical memory at the PAs other than the first PA.

An example method 14 can include features of any of the preceding example methods 12 to 13 and can include accessing the indirection table to include loading the indirection table for processing.

An example method 15 can include features of any of the preceding example methods 12 to 14 and can include accessing the indirection table to include accessing the indirection table in a cache, the indirection table including a first PA corresponding to the VA.

An example method 16 can include features of any of the preceding example methods 12 to 15 and can include the FSM freeing PAs for write operations by: obtaining a PA from the indirection table corresponding to the VA, the indirection table having a flag identifying a stripe of data at the PA is compressed data; reading a header from the stripe corresponding to the PA; and freeing for use the PA and additional PAs listed in the header.

An example method 17 can include features of any of the preceding example methods 12 to 16 and can include the user page size being 4 KB.

In an example method 18, any of the example methods 12 to 17 may be performed in operating an electronic apparatus further comprising a host processor and a communication bus extending between the host processor and the memory device.

In an example method 19, any of the example methods 12 to 18 may be modified to include operations set forth in any other of example methods 12 to 18.

In an example method 20, any of the example methods 12 to 19 may be implemented at least in part through use of instructions stored as a physical state in one or more machine-readable storage devices.

An example method 21 can include features of any of the preceding example methods 12 to 20 and can include performing functions associated with any features of example memory device 1 to 11.

An example method 21 can include features of any of the preceding example methods 1 to 11 and example methods 12 to 21 and can include performing functions associated with any features of example memory device 1 to 11.

An example machine-readable storage device storing instructions, that when executed by one or more processors, cause a machine to perform operations, can comprise instructions to perform functions associated with any features of example memory devices 1 to 11 or perform methods associated with any features of example methods 1 to 21.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description.

What is claimed is:

1. A memory device comprising:
a mapping table having an entry location to associate a virtual page with a physical address of a first stripe of data of the virtual page along with a flag, the flag identifying the data of the virtual page as compressed or uncompressed; and
a controller, responsive to the flag identifying the data of the virtual page being compressed, to generate a format of compressed data of the first stripe with a header, the header including i) a count of additional physical addresses to store compressed data of the virtual page and ii) the additional physical addresses.

2. The memory device of claim 1, wherein the additional physical addresses are physical addresses of additional stripes of the compressed data of the virtual page.

3. The memory device of claim 2, wherein the additional stripes of the compressed data of the virtual page have a format without a header.

4. The memory device of claim 1, wherein the format includes a user data block and an error correction code following the count of the additional physical addresses.

5. The memory device of claim 1, wherein the header has a predefined format dependent on size of the first stripe.

6. The memory device of claim 1, wherein the memory device includes the controller to make available physical addresses to write data from a host to a memory subsystem of the memory device.

7. The memory device of claim 1, wherein the memory device is a compute express link (CXL) type 3 memory device.

8. A method comprising:
accessing an indirection table based on a virtual address received in a read request from a host device;
reading a first stripe of compressed data from a physical memory at a physical address listed in the indirection table corresponding to the virtual address, the first stripe of the compressed data including a header and the compressed data, the header including i) a count of additional physical addresses storing compressed data and ii) the additional physical addresses;
uncompressing the compressed data of the first stripe, generating uncompressed data of the first stripe; and
sending the uncompressed data of the first stripe to the host.

9. The method of claim 8, wherein the method includes:
reading a next stripe of compressed data at a physical address retrieved from the header of the first stripe of the compressed data;
uncompressing the compressed data of the next stripe, generating uncompressed data of the next stripe; and
sending the uncompressed data of the next stripe along with the uncompressed data of the first stripe to the host.

10. The method of claim 8, wherein accessing the indirection table includes loading the indirection table in response to determination that the indirection table is not cached.

11. A method comprising:

accessing an indirection table based on a virtual address received in a read request from a host device;

reading a first stripe of compressed data from a physical memory at a physical address listed in the indirection table corresponding to the virtual address, the first stripe of the compressed data including a header and the compressed data;

uncompressing the compressed data of the first stripe, generating uncompressed data of the first stripe;

sending the uncompressed data of the first stripe to the host; and consecutively reading stripes of compressed data having physical addresses in the header of the first stripe, after uncompressing the first stripe of compressed data.

12. The method of claim 11, wherein the method includes uncompressing the compressed data of the stripes having the physical addresses in the header of the first stripe and copying the uncompressed data of the stripes, having the physical addresses in the header of the first stripe, to a cache along with the uncompressed data of the first stripe.

13. The method of claim 12, wherein the read request is a series of read requests and the uncompressed data of the stripes, having the physical addresses in the header of the first stripe, along with the uncompressed data from the first stripe are copied to read buffers for the series of read requests.

14. A method comprising:

accessing an indirection table based on a virtual address received in a read request from a host device;

reading a first stripe of compressed data from a physical memory at a physical address listed in the indirection table corresponding to the virtual address, the first stripe of the compressed data including a header and the compressed data;

uncompressing the compressed data of the first stripe, generating uncompressed data of the first stripe;

sending the uncompressed data of the first stripe to the host; and fetching the header of the first stripe for decomposition after uncompressing the first stripe.

15. A method comprising:

accessing an indirection table based on a virtual address received in a write request from a host device;

compressing data of a user page size corresponding to the write request;

obtaining physical addresses of a physical memory from a free space manager based on size of the compressed data corresponding to the write request;

updating the indirection table with a first physical address of the physical addresses;

generating a header including the physical addresses other than the first physical address and a count of the physical addresses other than the first physical address;

formatting the compressed data to include the header; and writing the formatted compressed data with the header to the physical memory at the first physical address.

16. The method of claim 15, wherein the method includes writing remaining compressed data corresponding to the write request to the physical memory at the physical addresses other than the first physical address.

17. The method of claim 15, wherein accessing the indirection table includes loading the indirection table for processing.

18. The method of claim 15, wherein accessing the indirection table includes accessing the indirection table in a cache, the indirection table including a first physical address corresponding to the virtual address.

19. The method of claim 15, wherein the method includes freeing physical addresses for write operations by:

obtaining a physical address from the indirection table corresponding to the virtual address, the indirection table having a flag identifying a stripe of data, at the physical address, is compressed data;

reading a header from the stripe corresponding to the physical address; and freeing for use the physical address and additional physical addresses listed in the header.

20. The method of claim 15, wherein the user page size is 4 KB.

* * * * *